W. F. WASHBURN.
MACHINE FOR BENDING WIRE STAYS.
APPLICATION FILED APR. 24, 1908.

905,256.

Patented Dec. 1, 1908.

3 SHEETS—SHEET 1.

WITNESSES:
Howard C. Cottrell.
Charles V. Hammond.

INVENTOR:
William F. Washburn.
By Herbert Cottrell. atty.

W. F. WASHBURN.
MACHINE FOR BENDING WIRE STAYS.
APPLICATION FILED APR. 24, 1908.
905,256.
Patented Dec. 1, 1908.
3 SHEETS—SHEET 2.
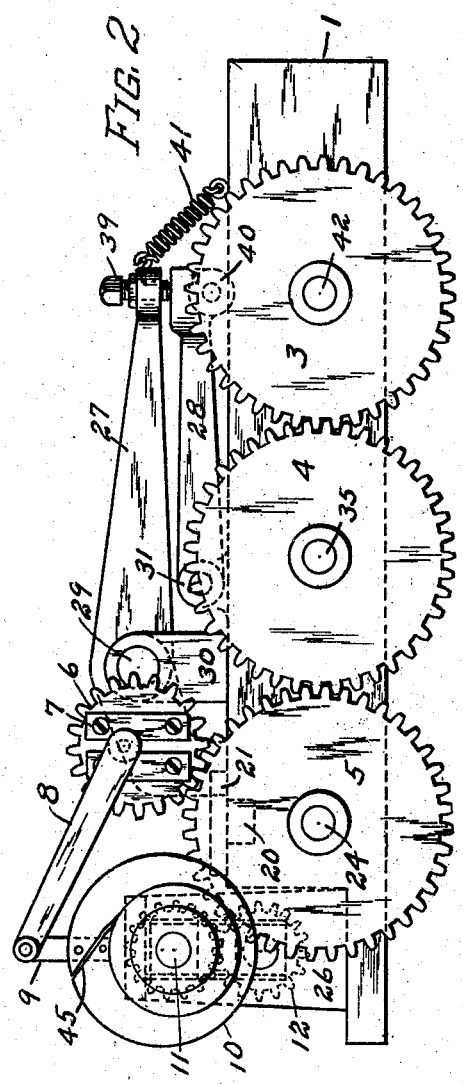
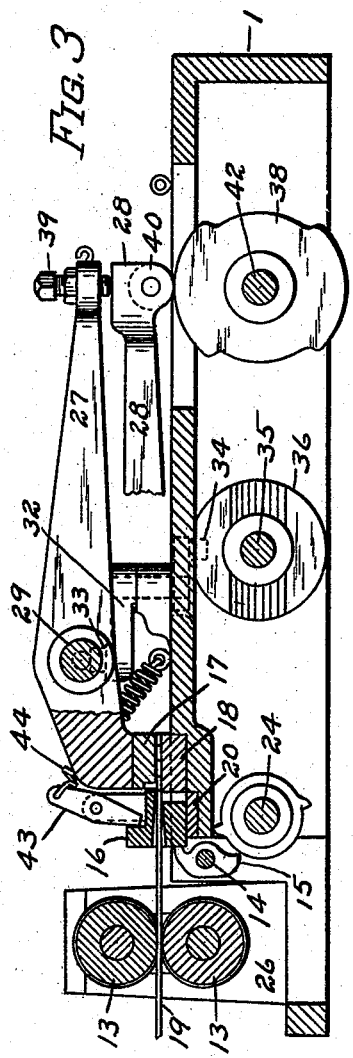
WITNESSES:
Howard C. Cottrell
Charles V. Hammond
INVENTOR:
William F. Washburn.
By Herbert Cottrell.
atty.

W. F. WASHBURN.
MACHINE FOR BENDING WIRE STAYS.
APPLICATION FILED APR. 24, 1908.

905,256.

Patented Dec. 1, 1908.

3 SHEETS—SHEET 3.

WITNESSES:
Howard C. Cottrell
Charles V. Hammond

INVENTOR:
William F. Washburn.
By Herbert Cottrell, atty.

UNITED STATES PATENT OFFICE.

WILLIAM F. WASHBURN, OF NEWARK, NEW JERSEY, ASSIGNOR TO BARCLEY CORSET COMPANY, OF NEWARK, NEW JERSEY, A CORPORATION OF NEW JERSEY.

MACHINE FOR BENDING WIRE STAYS.

No. 905,256.    Specification of Letters Patent.    Patented Dec. 1, 1908.

Application filed April 24, 1908. Serial No. 428,959.

*To all whom it may concern:*

Be it known that I, WILLIAM F. WASHBURN, a citizen of the United States, residing at Newark, in the county of Essex and State of New Jersey, have invented a new and useful Machine for Bending Wire Stays, of which the following is a specification.

My invention relates to improvements in machines for bending wire stays, in which an adjustable, intermittent, automatic, wire feed, coöperates with a longitudinally and laterally reciprocating forming guide, to feed the wire to dies carried by an oscillating and laterally reciprocating binding arm, to press the wire into the die in alternate tandem loops in consecutive succession; and the objects of my improvements are first, to provide automatic and adjustable control of the wire feeding and bending operation; second, to afford facilities for proper adjustment of the means for reciprocation independent of each other, with respect to the width of the dies and product, and the clamping action of the binding arm which carries the dies, and binds the wire while it is being bent and pressed into the die by the forming guide; and third, to reduce to the minimum the tendency of the machine to break the wire in the operation of bending. I attain these objects by the mechanism illustrated in the accompanying drawing, in which—

Figure 1:
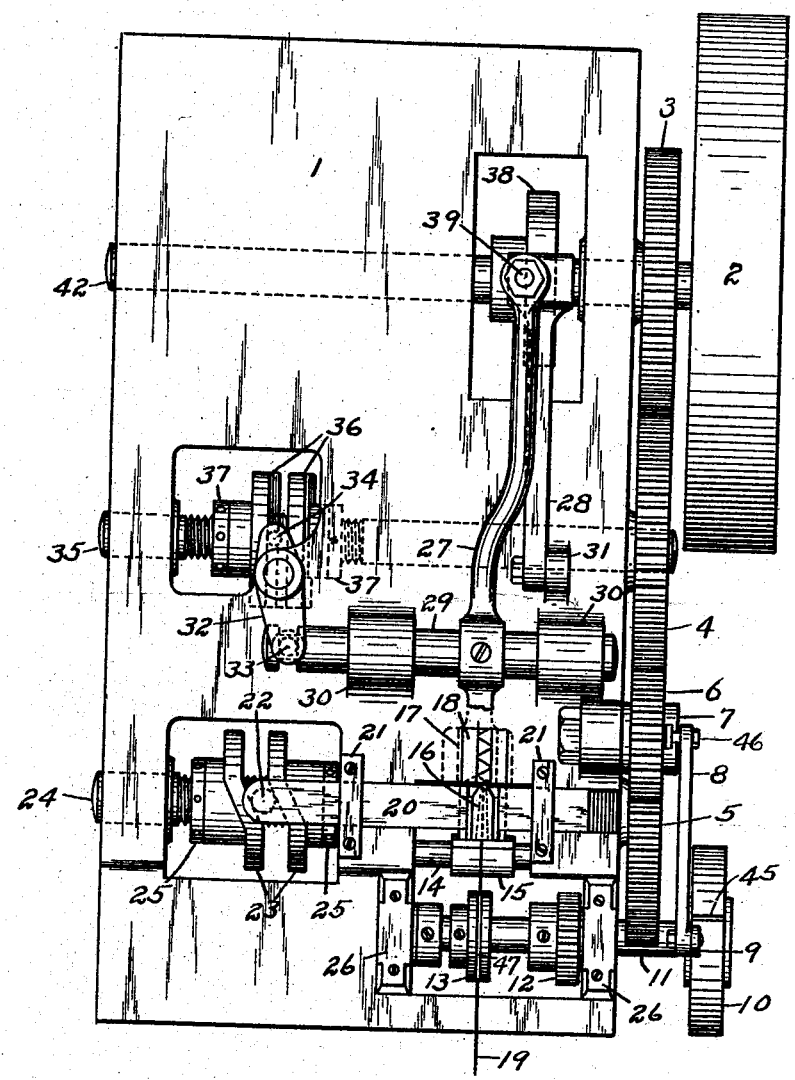
Figure 4:
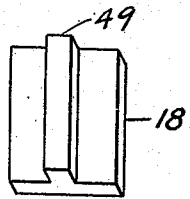
Figure 5:
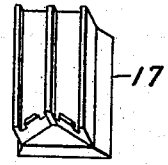
Figure 6:
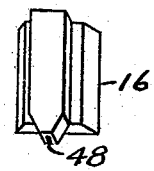
Figure 7:
Figure 8:
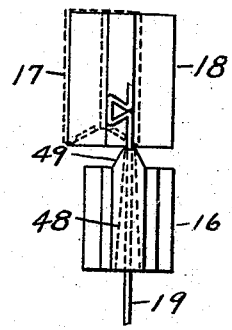
Figure 9:
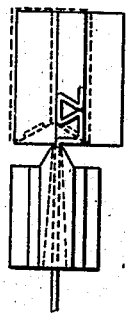
Figure 10:
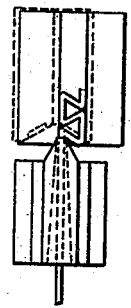
Figure 11:
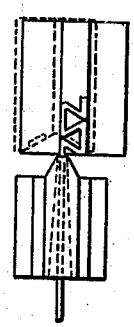
Figure 12:
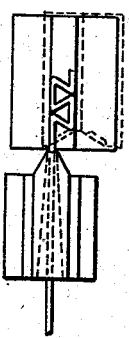
Figure 13:
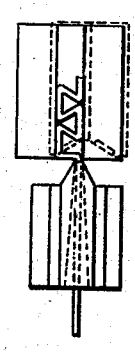
Figure 14:
Figure 15:
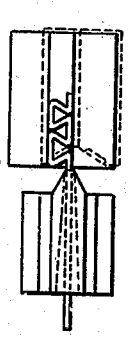

Figure 1 is a plan of the machine. Fig. 2 is a vertical side view of the same. Fig. 3 is a vertical sectional side view, in part cut away to show cams, etc. Fig. 4 is a detail showing anvil 18, adapted to be held fixed upon table 1, upon which the wire 19 is pressed by die 17 while being bent into loops. Fig. 5 is a view showing the die 17, which is shown double grooved to hold the stay 19, clamped alternately in either groove while the wire is being bent into loops. Fig. 6 is a detail of forming guide 16 comprising a dovetailed slide, perforated longitudinally through which the wire 19 is passed, and by its movement pressed by it into the die 17. Fig. 7 shows the product 19 consisting of alternate tandem loops of wire all lying in the same plane. Fig. 8 shows detail of anvil 18 and forming guide 16 with die 17 in dotted lines, the forming guide 16 being shown in position to recede from anvil 18. Fig. 9 shows position of forming guide 16 relatively to anvil 18, after it has receded, moved to the left, and pressed forward, bringing the wire 19 to a rectangular bend. Fig. 10 shows relative position of same parts when bend is completed to form a triangle. Fig. 11 shows relative position of same parts when forming guide 16 is about to recede again. Figs. 12 to 15 inclusive are details of right hand position of die 17, anvil 18, and forming guide 16, in the operation to form alternate loop, the movements being oppositely similar to those in above described figures.

Similar figures refer to similar parts throughout the several views.

The table or plate 1 constitutes the frame of the machine, and sustains in proper bearings shafts 24, 35, and 42. Shaft 42 carries combined flywheel and driving pulley 2, double cam 38, and spur gear 3; similar spur gears 4 and 5 are on shafts 35 and 24, and engage with gear 3 to turn their shafts in equal time. Shaft 29 is adapted to slide laterally and oscillate in bearings 30, 30 attached to top of plate 1 and supports binding arm 27, which is adjusted by screw 39 and carries die 17 and is oscillated through the medium of interposed lever 28, pivoted at 31 and roller 40 bearing upon double cam 38 on shaft 42, and held in contact by spring 41. The lateral slide movement of shaft 29 is actuated and governed by adjustment of divided cam on threaded part on shaft 35, and is moved through the medium of lever 32 and roller pins 33, 34; the limit of motion being adjusted by nuts 37, 37 on cam 36.

The shaft 24 carries adjustable divided cam 23 with adjusting collars 25, 25, and operates through the medium of roller pin 22, the transverse slide 20, which is held in bearings 21, on which is mounted in dovetailed slot the forming guide 16, adapted to be moved at right angles to the movement of slide 20, receiving its forward movement by the action of a double cam on shaft 24, (Fig. 3) and intermediate pallet 15 on shaft 14, and being retracted by pallet 43 and spring 44. The forming guide 16 is perforated longitudinally to allow the wire 19 to pass through, and guides the wire while held upon anvil 18, and presses it into the die 17, in the forward movement as described.

The feed movement for the wire is mounted on shaft 11, Fig. 2, and consists of a spring clamp 10 which embraces an internal hub, keyed to the shaft 11. The clamp 10 is split at its point of connection 45 to lever 9 and is shown with its ends connected by pins to lever 9, in such position that if the lever 9 be pressed one way the split 45 will be opened and the clamping pressure will be diminished upon the internal hub, and if pressed in the other way the pressure be increased and the shaft 11 be caused to turn. As the lever 9 is attached by connection 8 to adjustment in slotted gear 6, which may be set in slot 7 to the desired variation of feed, the wire 19 may be automatically and intermittently fed through rolls 13, 13 driven by gear 12 and held in bearings 26, through forming guide 16, to die 17; to form the product 19. I wish it to be understood that I do not confine myself to this particular form of feed movement in connection with my invention, but may employ a system of ratchets or other similar mechanical devices to give positive, intermittent, adjustable feed movement to the wire.

The operation of the machine to produce the finished product 19, Fig. 7, is as follows; the wire 19 is fed intermittently and at the proper rate through the rotation of gear 6 and the adjustment thereon in slot 7, transmitted by connection 8, and pivots of lever 9, to split spring clamp 10, whereby the said clamp alternately releases and clamps its internal hub, which is keyed upon shaft 11, and rotates the same as far as desired, with alternating cessation of motion for the period required. Upon shaft 11 are the grooved rolls 13—13 between which the wire is clamped and passed to forming guide 16, which is perforated lengthwise for the wire to pass through and be forced into die 17 and be held by binding arm 27 upon anvil 18 as in Fig. 3. The slide 20 carrying in dovetailed slot forming guide 16 is moved laterally by cam 23 on shaft 24, producing a diagonal bend in the wire; then the double throw cam on shaft 24 through pallet 15 on shaft 14 presses forming guide 16 forward at right angles to slide 20 producing one diagonal side bend of the triangular wire formation in the die 17; the projection on cam having passed pallet 15, the pallet 43 and spring 44 presses forming guide 16 back to its first position, the binding arm 27 is released by cam 38, and the wire fed forward by the feed mechanism described, for the next bend; as this next bend requires the support of that part of the die with reverse angle, the binding arm 27 being released by rotation of cam 38, is moved laterally by cam 36 to its proper position, and is caused by cam 38 to again clamp the wire between die 17 and anvil 18, the slide 20 is moved laterally in a reverse direction, then forming guide 16 is moved forward again as before making first the diagonal bend, then the rectangle, and finally the triangular bend in the wire as set forth in Figs. 4 to 15 inclusive, producing tandem loops in automatic, consecutive succession, to produce the product 19.

I claim—

1. The combination in a wire bending machine having variable intermittent feed for the wire, of a longitudinally reciprocating forming guide carried by a slide adapted to be reciprocated laterally; and a binding arm arranged to carry dies and to oscillate and to move laterally, for the purpose of clamping the wire during the operation of bending, as set forth, and substantially as shown and described.

2. In a wire bending machine, the combination of an oscillating and laterally reciprocating binding arm, with an adjustably divided cam to give variable lateral movement to the said binding arm; means for securing variable intermittent wire feed, and means for pressing the wire laterally and longitudinally into the die, substantially as shown and described.

3. In a wire bending machine, having means for variable intermittent wire feed, the combination of an adjustably divided cam, with a laterally reciprocating slide carrying a transversely reciprocating forming guide perforated for wire to pass through, and means for holding the die and clamping the wire during the operation of bending, substantially as shown and described.

4. In a wire bending machine the combination of a forming guide having both lateral and longitudinal reciprocation and adapted to carry the wire to the die, and a die held upon a binding arm, adapted to clamp the wire during the forming operation in the die, substantially as shown and for the purposes specified.

In testimony whereof I have signed my name to this specification in the presence of two subscribing witnesses.

WILLIAM F. WASHBURN.

Witnesses:
 HELEN M. SULLIVAN,
 HARRY P. GOFFROW.